US012693932B2

(12) United States Patent
N et al.

(10) Patent No.: US 12,693,932 B2
(45) Date of Patent: Jul. 28, 2026

(54) DATA STORAGE DEVICE AND METHOD FOR GENERATING READ THRESHOLD VOLTAGES

(71) Applicant: Sandisk Technologies, Inc., Milpitas, CA (US)

(72) Inventors: Mohith Kumar N, Bengaluru (IN); Raja Sivasankaran, Salem (IN); Darshan Pagariya, Gondia (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/664,514

(22) Filed: May 15, 2024

(65) Prior Publication Data

US 2025/0355762 A1      Nov. 20, 2025

(51) Int. Cl.
*G06F 11/10*          (2006.01)

(52) U.S. Cl.
CPC ...... *G06F 11/1016* (2013.01); *G06F 11/1068* (2013.01)

(58) Field of Classification Search
CPC ............................................... G06F 11/1016
USPC ................................................ 714/764, 767
See application file for complete search history.

(56) References Cited

U.S. PATENT DOCUMENTS

| | | | |
|---|---|---|---|
| 6,154,157 A | 11/2000 | Wong | |
| 7,876,671 B2 | 1/2011 | Pimlott | |
| 7,995,387 B2 | 8/2011 | Sharon et al. | |
| 8,374,026 B2 | 2/2013 | Sharon et al. | |
| 8,782,495 B2 | 7/2014 | Alrod et al. | |
| 9,070,479 B2 | 6/2015 | Sharon et al. | |
| 9,141,475 B2 | 9/2015 | Alrod et al. | |
| 9,431,120 B1 | 8/2016 | Tuers | |
| 9,697,905 B2 | 7/2017 | Sharon et al. | |
| 9,728,263 B2 | 8/2017 | Sharon | |

(Continued)

FOREIGN PATENT DOCUMENTS

| | | | | |
|---|---|---|---|---|
| CN | 119537274 A | * | 2/2025 | ............. G11C 29/52 |
| JP | 2021047963 A | | 3/2021 | |

(Continued)

OTHER PUBLICATIONS

U.S. Appl. No. 17/838,481, filed Jun. 13, 2022, entitled "Storage System and Method for Inference of Read Thresholds Based on Memor Parameters and Conditions."

(Continued)

*Primary Examiner* — Albert Decady
*Assistant Examiner* — Enam Ahmed
(74) *Attorney, Agent, or Firm* — Crowell & Moring LLP

(57)          ABSTRACT

A bit error rate (BER) estimation scan (BES) typically uses static read thresholds during the scan process. These fixed thresholds might not adapt to variations in memory cell characteristics, leading to suboptimal BER estimation and error correction. The embodiments presented herein can be used to address this problem by providing a hybrid variation of BES and on-chip (e.g., in a controller ASIC) threshold voltage (Vth) tracking. In one example, BER results from BES failing pages are used to update Vth tracking parameters. In this way, BER results can be used to identify the most unreliable memory pages, and the Vth tracking parameters can be updated to reduce the BER for those pages. Other examples are provided.

12 Claims, 9 Drawing Sheets

(56) References Cited

U.S. PATENT DOCUMENTS

| | | | |
|---|---|---|---|
| 9,996,281 | B2 | 6/2018 | Sharon et al. |
| 10,379,739 | B1 | 8/2019 | Bazarsky et al. |
| 10,418,097 | B2 | 9/2019 | Avraham et al. |
| 10,475,523 | B2 | 11/2019 | Sharon et al. |
| 10,811,091 | B2 | 10/2020 | Bazarsky et al. |
| 10,861,562 | B1 | 12/2020 | Xiong |
| 10,991,444 | B1 | 4/2021 | Bazarsky et al. |
| 11,081,474 | B1 | 8/2021 | Hoang et al. |
| 11,150,825 | B2 | 10/2021 | Kashyap et al. |
| 11,244,732 | B2 | 2/2022 | Sharon et al. |
| 11,721,409 | B2 | 8/2023 | Rayaprolu et al. |
| 11,875,831 | B2 | 1/2024 | Pletka et al. |
| 11,960,989 | B2 | 4/2024 | Zhang |
| 12,437,814 | B2 | 10/2025 | Avraham |
| 12,451,187 | B2 | 10/2025 | Avraham |
| 12,493,427 | B1 | 12/2025 | Avraham et al. |
| 2003/0142727 | A1* | 7/2003 | Monogioudis ............ H04L 1/20 |
| | | | 375/147 |
| 2010/0162084 | A1 | 6/2010 | Coulson |
| 2012/0063227 | A1 | 3/2012 | Weingarten et al. |
| 2012/0163074 | A1 | 6/2012 | Franca-Neto |
| 2013/0015519 | A1 | 1/2013 | Fujii |
| 2013/0130652 | A1 | 5/2013 | Wood |
| 2014/0056066 | A1 | 2/2014 | Baum et al. |
| 2014/0136927 | A1* | 5/2014 | Li ........................ G06F 11/1016 |
| | | | 714/768 |
| 2014/0173172 | A1 | 6/2014 | Yang et al. |
| 2014/0355340 | A1 | 12/2014 | Sharon et al. |
| 2015/0082121 | A1* | 3/2015 | Wu ........................ G11C 16/349 |
| | | | 714/764 |
| 2015/0193303 | A1* | 7/2015 | Katagiri ............. G11B 20/1803 |
| | | | 714/764 |
| 2015/0262694 | A1 | 9/2015 | Seo et al. |
| 2015/0301888 | A1* | 10/2015 | Yang .................. H03M 13/1102 |
| | | | 714/764 |
| 2017/0139590 | A1 | 5/2017 | Hsu et al. |
| 2017/0162268 | A1 | 6/2017 | Chen et al. |
| 2018/0260007 | A1 | 9/2018 | Ping |
| 2018/0293029 | A1* | 10/2018 | Achtenberg ......... G11C 29/028 |
| 2018/0293174 | A1 | 10/2018 | Song |
| 2019/0127798 | A1 | 5/2019 | Hagstrom |
| 2019/0189236 | A1 | 6/2019 | Poliakov et al. |
| 2019/0267054 | A1* | 8/2019 | Thalaimalaivanaraj ..................... |
| | | | G06F 11/1048 |
| 2019/0371402 | A1 | 12/2019 | Lin |
| 2020/0105353 | A1 | 4/2020 | Sharon et al. |
| 2020/0159464 | A1 | 5/2020 | Park |
| 2020/0183783 | A1 | 6/2020 | Xie et al. |
| 2020/0192791 | A1* | 6/2020 | Yang ........................ H04L 1/203 |
| 2020/0211664 | A1* | 7/2020 | Vashi .................. G06F 11/3034 |
| 2020/0364108 | A1 | 11/2020 | Froelich et al. |
| 2020/0364118 | A1 | 11/2020 | Sun |
| 2021/0050067 | A1 | 2/2021 | Oh et al. |
| 2021/0241845 | A1 | 8/2021 | Li et al. |
| 2021/0326058 | A1 | 10/2021 | Lee |
| 2021/0334035 | A1 | 10/2021 | Sheperek et al. |
| 2022/0027721 | A1 | 1/2022 | Zhang et al. |
| 2022/0075561 | A1 | 3/2022 | Peltz et al. |
| 2022/0076738 | A1* | 3/2022 | Bazarsky ............ G11C 11/5628 |
| 2022/0121387 | A1 | 4/2022 | Ha et al. |
| 2022/0121985 | A1 | 4/2022 | Lloyd et al. |
| 2022/0188366 | A1 | 6/2022 | Song |
| 2022/0215052 | A1 | 7/2022 | Chalana |
| 2022/0254419 | A1 | 8/2022 | Kim et al. |
| 2022/0391308 | A1 | 12/2022 | Brown |
| 2023/0027191 | A1 | 1/2023 | Zhang |
| 2023/0035983 | A1 | 2/2023 | Wang |
| 2023/0061920 | A1 | 3/2023 | Bhardwaj |
| 2023/0176765 | A1 | 6/2023 | Wang et al. |
| 2023/0402112 | A1 | 12/2023 | Sharon |
| 2023/0420059 | A1 | 12/2023 | Avraham et al. |
| 2024/0086101 | A1 | 3/2024 | Wang |
| 2024/0265327 | A1 | 8/2024 | Pasha |
| 2024/0330717 | A1 | 10/2024 | Lien et al. |
| 2025/0118376 | A1* | 4/2025 | Shenoy .................. G11C 16/16 |
| 2025/0165148 | A1 | 5/2025 | Shukla |

FOREIGN PATENT DOCUMENTS

| | | |
|---|---|---|
| JP | 2021149995 A | 9/2021 |
| JP | 2022045317 A | 3/2022 |
| JP | 2024102806 A | 7/2024 |
| JP | 2025069735 A | 5/2025 |
| WO | 2023196317 A1 | 10/2023 |

OTHER PUBLICATIONS

U.S. Appl. No. 17/899,073, filed Aug. 30, 2022, entitled "Storage System and Method for Implementation of Symmetric Tree Models for Read Threshold Calibration."

U.S. Appl. No. 18/220,363, filed Jul. 11, 2023, entitled "Storage System and Method for Circuit-Bounded-Array-Based Time and Temperature Tag Management and Inference of Read Thresholds."

U.S. Appl. No. 18/239,302, filed Aug. 29, 2023, entitled "Data Storage Device and Method for Inferring a Read Threshold Using a Time Tag Determination."

U.S. Appl. No. 18/242,061, filed Sep. 5, 2023, entitled "Data Storage Device and Method for Predicting Future Read Thresholds."

U.S. Appl. No. 18/777,942, filed Jul. 19, 2024, entitled "Data Storage Device and Method for Using Multiple Models for Predicting a Read Threshold."

U.S. Appl. No. 18/800,681, filed Aug. 12, 2024, entitled "Data Storage Device and Method for Combining Prediction Models for Read Threshold Calibration."

U.S. Appl. No. 18/658,074, filed May 8, 2024, entitled "Data Storage Device and Method for Predictive Read Threshold Calibration."

U.S. Appl. No. 18/772,563, filed Jul. 15, 2024, entitled "Data Storage Device and Method for Using Modular Models for Inferring a Read Threshold."

Non-final Office Action mailed Jun. 16, 2025 for U.S. Appl. No. 18/220,363.

Non-final Office Action mailed Jun. 16, 2025 for U.S. Appl. No. 18/242,061.

Non-final Office Action dated Jan. 9, 2026 for U.S. Appl. No. 18/800,681.

Aytekin, C.; "Neural Networks are Decision Trees"; AAC Technologies; Oct. 15, 2022; 8 pages.

Non-final Office Action dated Nov. 18, 2025 for US. Appl. No. 18/658,074.

International Search Report mailed Feb. 10, 2026 in International Application No. PCT/US2025/044975.

Written Opinion mailed Feb. 10, 2026 in International Application No. PCT/US2025/044975.

* cited by examiner

TO HOST

NON-VOLATILE
STORAGE SYSTEM

CONTROLLER   102

100

104   NON-VOLATILE
MEMORY

STORAGE MODULE
200

TO HOST

202   STORAGE
CONTROLLER

204

102   CONTROLLER
100
104   NVM

102   CONTROLLER
100
104   NVM

102   CONTROLLER
100
104   NVM

HOST   252   •  •  •   HOST   252   HIERARCHICAL STORAGE
SYSTEM
250

202   STORAGE
CONTROLLER   •  •  •   202   STORAGE
CONTROLLER   •  •  •

204   STORAGE
SYSTEM   •  •  •   204   STORAGE
SYSTEM   •  •  •

DATA STORAGE DEVICE AND METHOD FOR GENERATING READ THRESHOLD VOLTAGES

BACKGROUND

Bit error rate (BER) estimation scan (BES) and valley search (VS) are operations that can be used to optimize a read threshold voltage for a specific wordline in a memory of a data storage device. One approach is to track the read threshold per group of blocks. For example, blocks that are written roughly at the same time and temperature can be grouped into a time and temperature (TT) group. Read thresholds can be tracked for each time-and-temperature group, usually acquired on some representative wordline from a block within the group. When a host performs a read operation, the read threshold associated with the time-and-temperature group corresponding to the read block can be used with or without additional adaptation.

DETAILED DESCRIPTION

The following embodiments generally relate to a data storage device and method for generating read threshold voltages (e.g., to improve memory reliability using BES and selective on-chip Vth tracking). In one embodiment, a data storage device is provided comprising a memory and one or more processors. The one or more processors, individually or in combination, are configured to: obtain a bit error rate (BER) estimation scan (BES) result from a page in the memory; update a threshold voltage (Vth) tracking parameter with the BES result from the page in the memory; and use the updated Vth tracking parameter to read the page in the memory, wherein using the updated Vth tracking parameter to read the page in the memory reduces the BER of the page.

In another embodiment, a method is provided that is performed in a data storage device comprising a memory. The method comprises: performing a default read on a plurality of pages of the memory; performing a bit error rate (BER) estimation scan (BES) on each of the plurality of pages of the memory; using the BER results of failing pages of the memory to update a threshold voltage (Vth) tracking parameter; adjusting read levels for the failing pages according to the updated Vth tracking parameter; and reading the failing pages with the adjusted read levels.

In yet another embodiment, a data storage device is provided comprising: a memory; and means for using bit error rate (BER) to identify an unreliable page in the memory and update an on-chip threshold voltage (Vth) tracking parameter to reduce the BER for the unreliable page.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B, 1C:
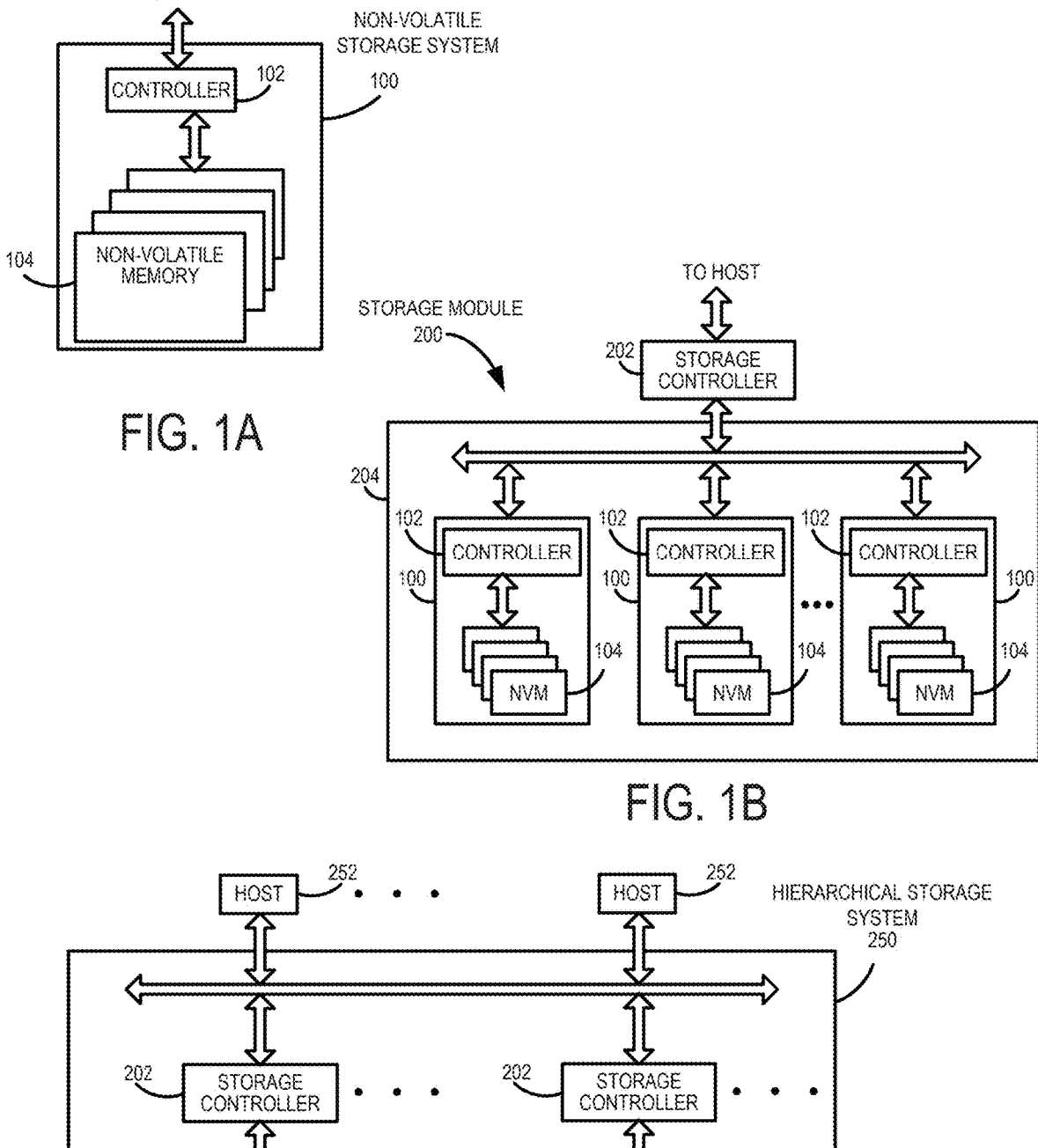
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
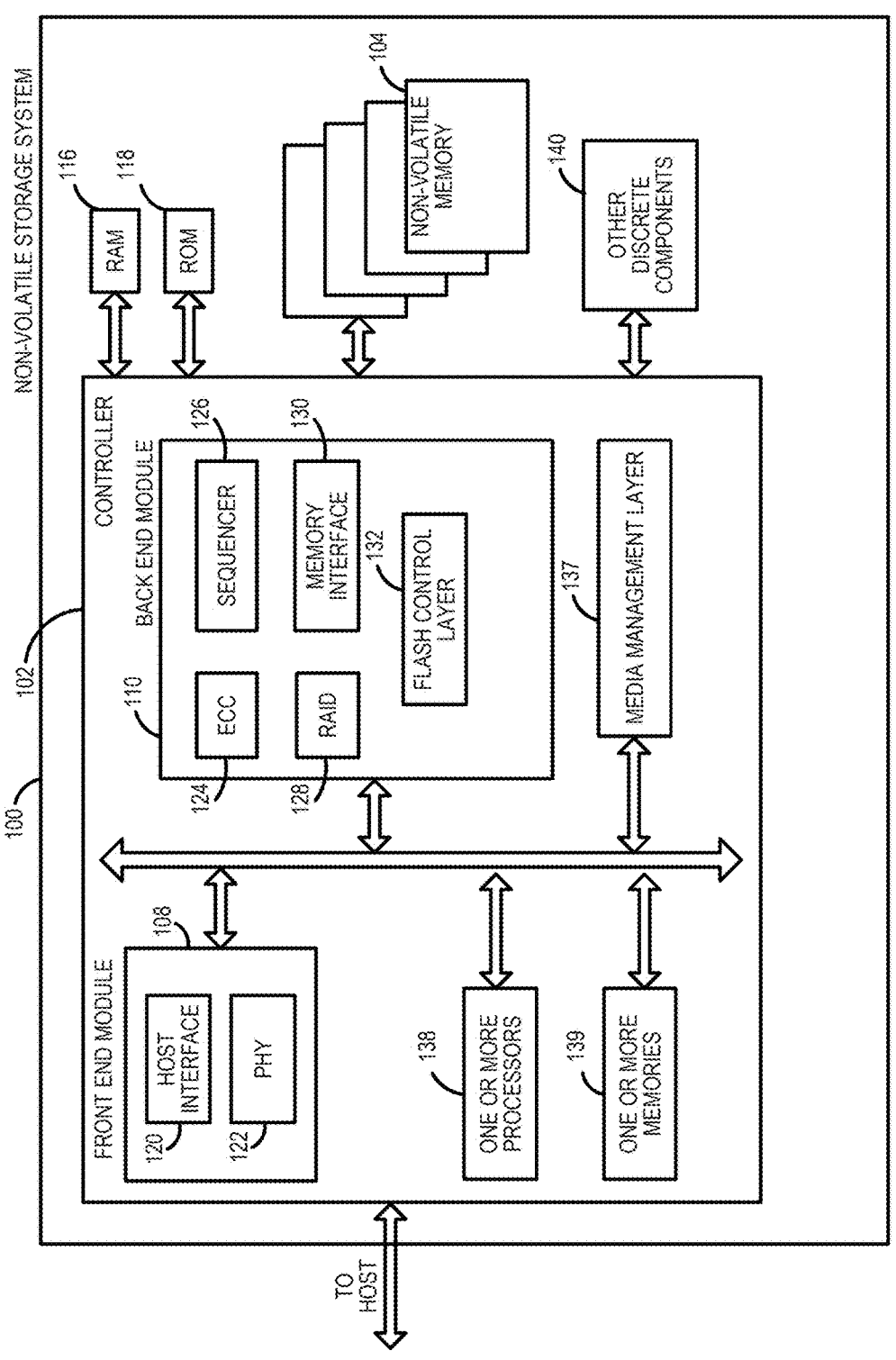
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
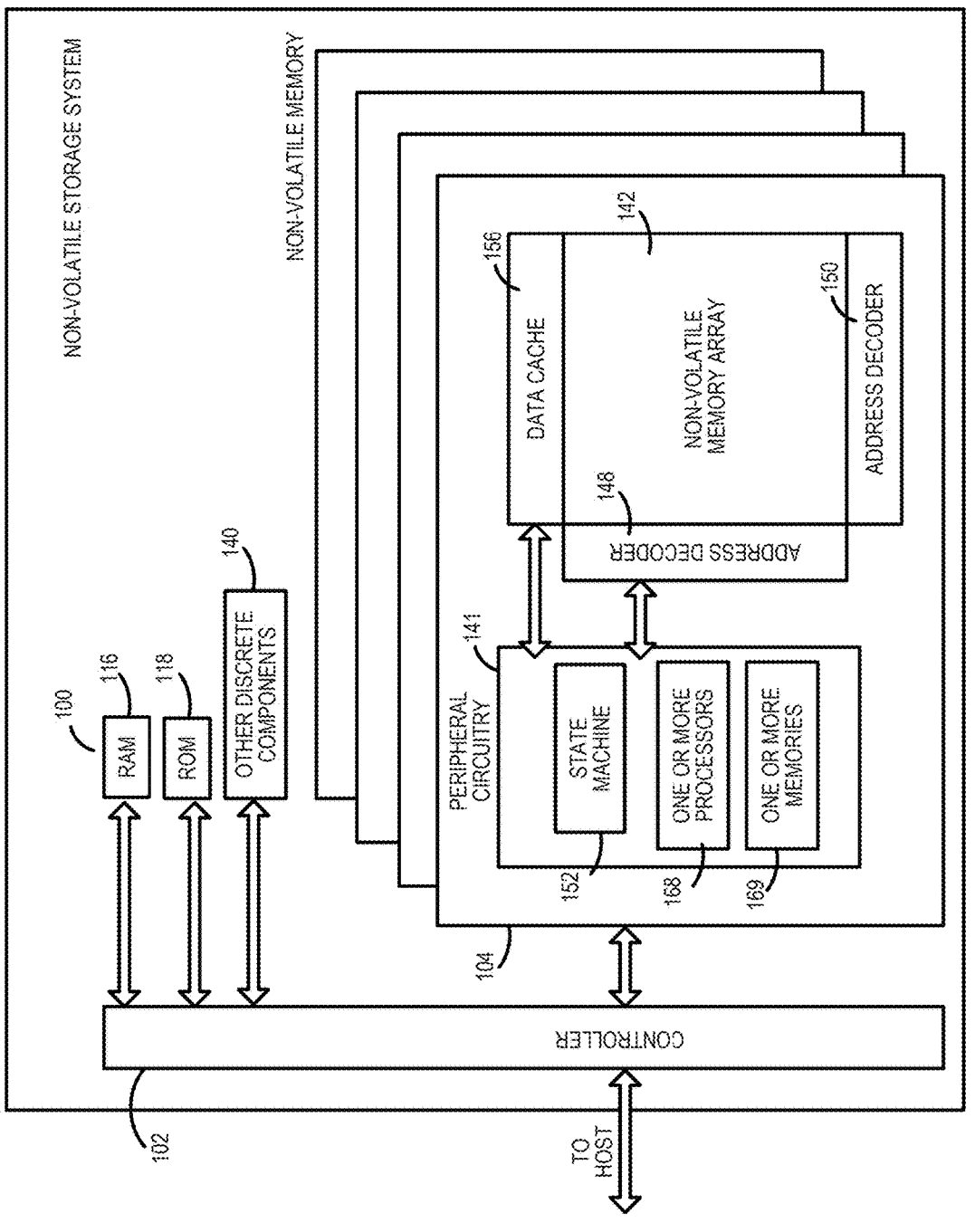
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
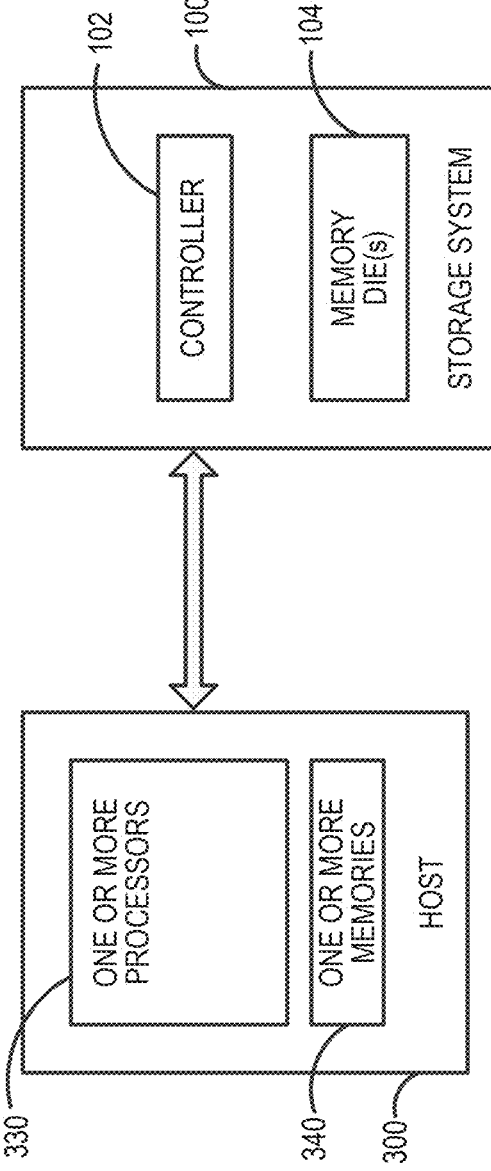
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, bit error rate (BER) estimation scan (BES) and valley search (VS) are operations that can be used to optimize a read voltage threshold for a specific wordline in a memory of a data storage device. One approach is to track the read threshold per group of blocks. For example, blocks that are written roughly at the same time and temperature can be grouped into a time and temperature (TT) group. Read thresholds can be tracked for each time-and-temperature group, usually acquired on some representative wordline from a block within the group. When the host performs a read operation, the read threshold associated with the time-and-temperature group corresponding to the read block is used with or without additional adaptation.

The following paragraphs highlight limitations of performing a BES operation. For example, BES typically uses static read thresholds during the scan process. These fixed thresholds might not adapt to the variations in memory cell characteristics, leading to suboptimal bit error rate (BER) estimation and error correction. BES has limitations in adapting to the changing memory block behavior. Also, conventional BER estimation techniques, such as interpolation estimators, involve multiple read senses to identify regions with low BER (with BES-7, 21 sense operation). However, these methods can be time-consuming and resource intensive. Moreover, they may not fully exploit the potential benefits of on-chip Vth tracking, which allows for adaptive read thresholds based on the changing characteristics of memory cells. (As used herein, "on-chip" refers to performing an operation in an integrated circuit (e.g. in the controller) in the data storage device.) Further, without knowing the specific regions with high/low BER, low-density parity check (LDPC) error correction mechanisms might treat the entire memory device as having the same level of reliability. As a result, error correction algorithms might not be effectively utilized to enhance the reliability of data storage. This adds more effort required by a data storage device manufacture to provide characterization results.

More specifically, some data storage devices define the threshold regions for consideration of high BER and low BER. Based on these considerations, BES course, BES extended, and BES fine operation are performed. During each operation of BES, the controller of the data storage device estimates BER and determines which region of BER the estimation corresponds to with a deep-learning accelerator (DLA) read to avoid read disturb (RD). These are static thresholds that do not change over the degradation of the BiCS device.

Figure 4:
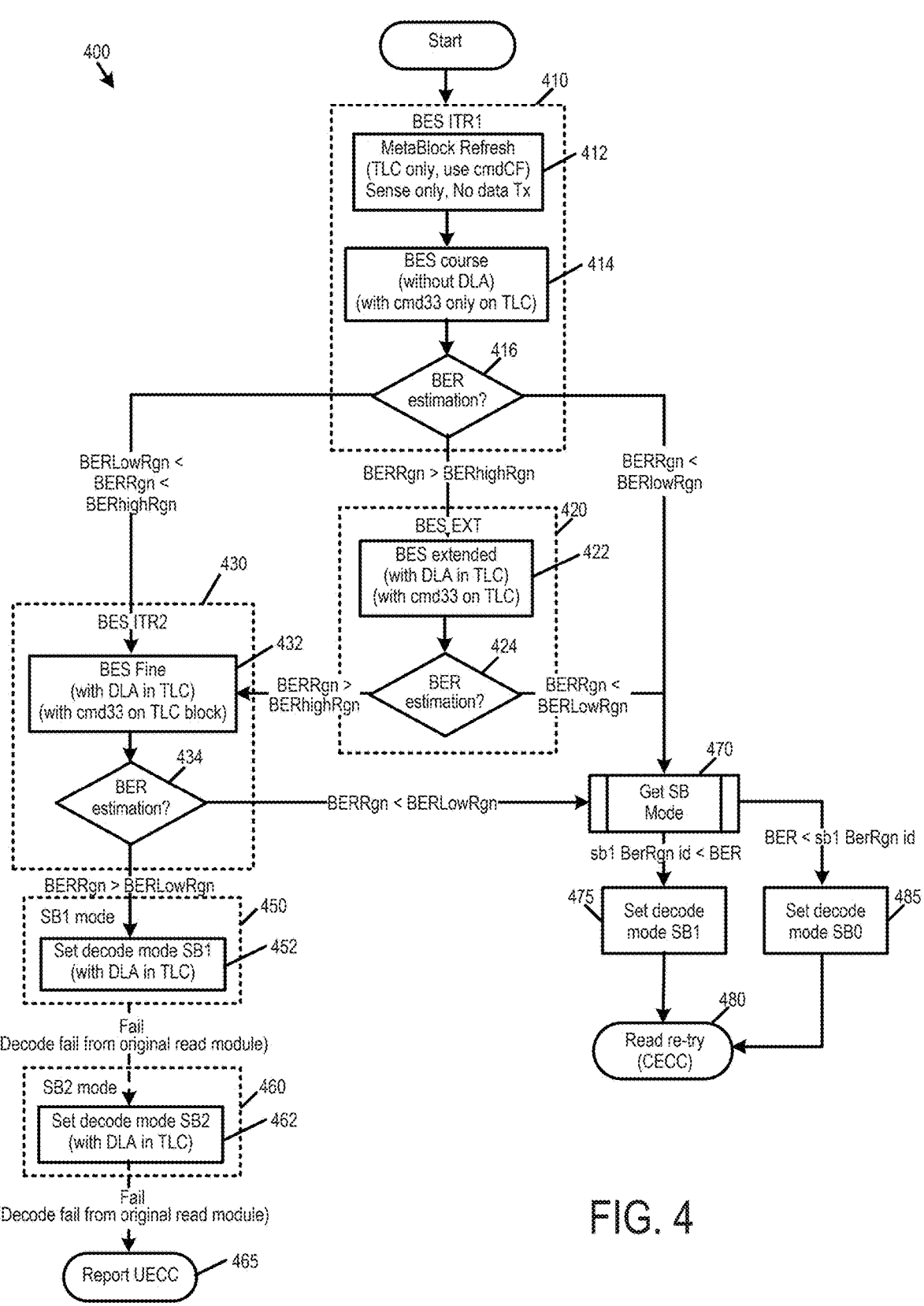
FIG. 4 is a flow chart of a deep read exception handling (REH) method of an embodiment.

FIG. 4 is a flow chart of a deep read exception handling (REH) method of an embodiment. As shown in FIG. 4, at the start of the method, the controller 102 of the data storage device 100 performs a first iteration of BES (410) comprising a metablock refresh (412), a course BES (414), and a BER estimation (416). If the BER estimation is above a certain threshold, the controller 102 performs an extended BES operation and performs another BER estimation (420, 422, 424). Depending on the results of that estimation, the controller performs acts 432 or 470, as described below.

Turning back to act 416, if the BER estimation at act 416 is below a certain threshold, the controller 102 performs a second iteration of BES (430), comprising a fine BES (432) and a BER estimation (434). If that BER estimate is greater than a threshold, the controller 102 enters SB1 mode (450, 452) and then SB2 mode (460, 462), after which an uncorrectable error correction code (UECC) error is reported (465). However, if the BER estimation is above the certain threshold or if the BER estimation at act 416 is below another threshold, the controller 102 gets the SB mode 470, sets the decode mode to SB1 or SB2 depending on different criteria (acts 475, 485), and retries the read (act 480).

So, in an example scenario of an extreme case of DR or RD, the worst path in the flow chart will be taken as follow: (1) BES Course (seven read sense with delta 12) with BER estimation on default read parameter values. The result of estimation is greater than the highBER threshold region; (2) BES extended (seven read sense with delta 16) with BER estimation on default read parameters values. The result of estimation is greater than the lowBER threshold region; (3) BES fine (seven read sense with delta eight) with BER estimation on optimal read parameters from previous BES operation. The result of the estimation is greater than the low BER threshold region; and (4) decoding with SB1 and SB2, if it fails for both the decode, an uncorrectable error correction code (UECC) error is reported, and XOR recovery is performed.

Figure 5:
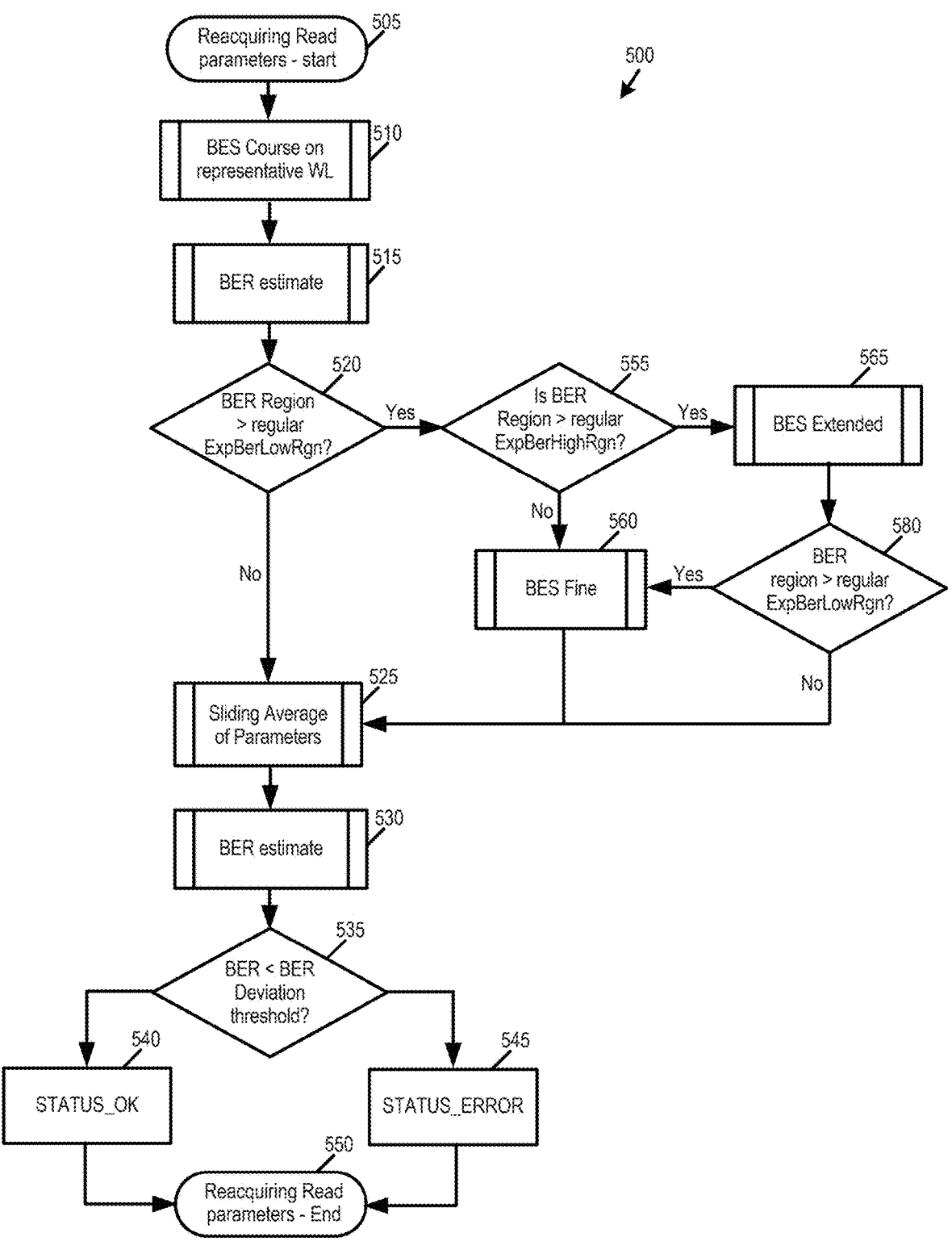
FIG. 5 is a flow chart that illustrates usage of a bit error rate (BER) estimation scan (BES) of an embodiment during a time tag (TT) update.

FIG. 5 is a flow chart 500 of a cell voltage distribution (CVD) tracking method that is similar to the flow chart 400 but with some changes. As shown in FIG. 5, this method comprises the controller 102 of the data storage device 100 reacquiring read parameters (act 505), performing a course BES on a representative wordline in the memory 104 (act 510), performing a BER estimation (act 515), and determining whether the BER region is above a threshold (act 520). If the BER region is not above the threshold, the controller 102 generates a sliding average of parameters (act 525), performs another BER estimation (act 530), determines whether the BER is less than a BER deviation threshold (act 535), sets "status ok" or "status error" accordingly (acts 540, 545), and then ends the process of reacquiring the read parameters (act 550).

Turning back to act 520, if the BER region is above the threshold, the controller 102 determines if the BER region is above another threshold (act 555). If it is not, the controller 102 performs a fine BES operation (act 560), and the method proceeds to act 525, as described above. However, it is the controller 102 performs an extended BES operation (act 565) and determines if the BER region is above a threshold (act 580). If it is, the controller 102 performs a fine BES operation (act 560), as described above. If it is not, the controller 102 generates a sliding average of parameters (act 525), as described above.

As mentioned above, there can be limitations in performing a BES operation. To address these limitations, the following embodiments provide a hybrid variation of BES and on-chip (e.g., in the controller ASIC) Vth tracking that can prove beneficial before applying a soft bit decode. In one example embodiment, the feedback loop in the algorithm used by the controller 102 is the process of using the BER results from BES failing pages to update the on-chip Vth tracking parameters for scan voltage, number of scans, and voltage size between scans. The BER results are used to identify the most unreliable pages, and the Vth tracking parameters are updated to reduce the BER for those pages. This process is repeated until the Vth tracking parameters converge to local minima. The underlying assumption here is that the BES course returns parameters that are closer to finding the low BER values before it fails from which on-chip Vth tracking starts of as initial parameters.

Figure 6:
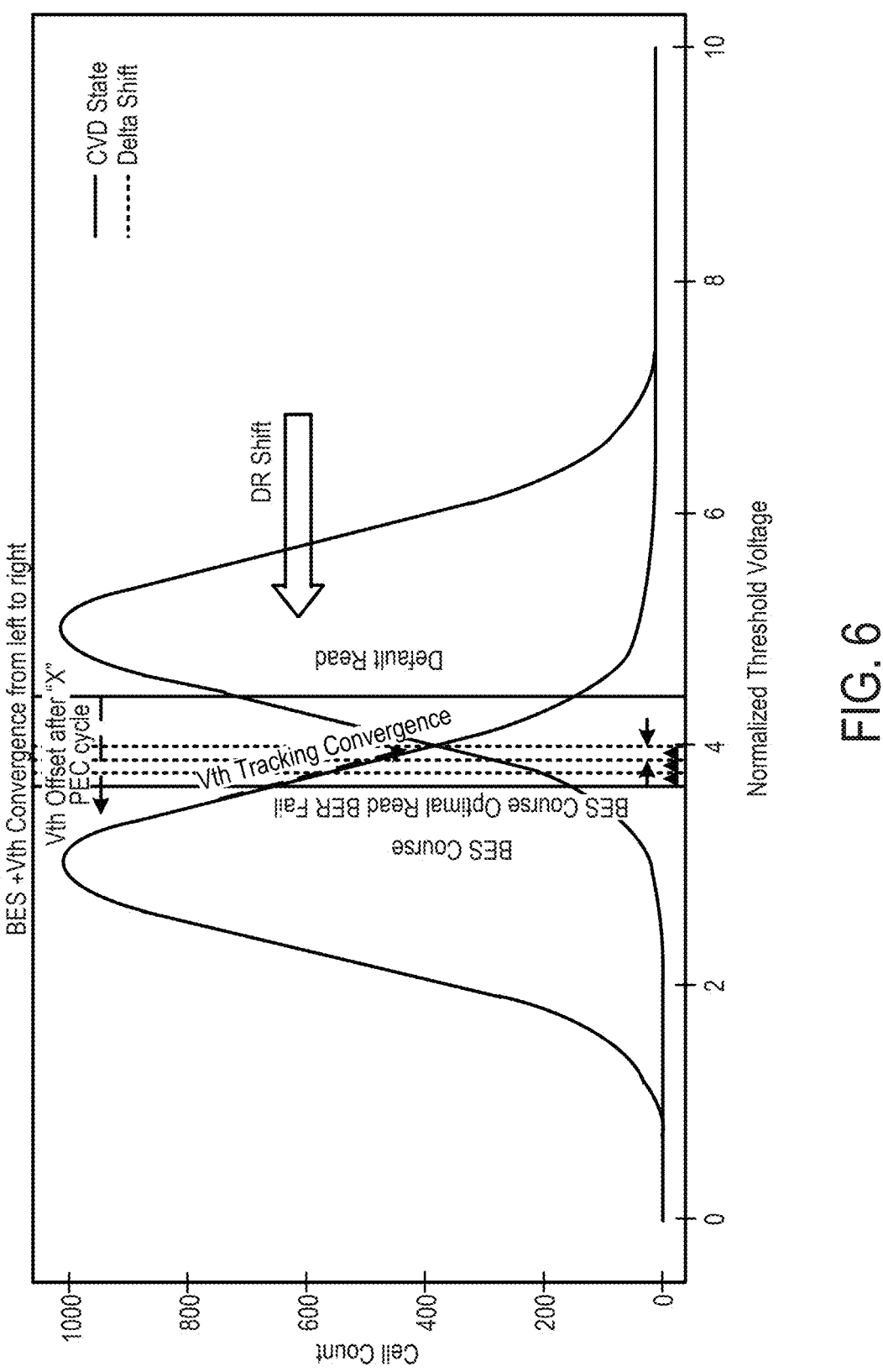
FIG. 6 is a graph of BES with on-chip threshold voltage (Vt) tracking convergence from left to right after a certain program-erase count (PEC) cycle due to data retention (DR).
Figure 7:
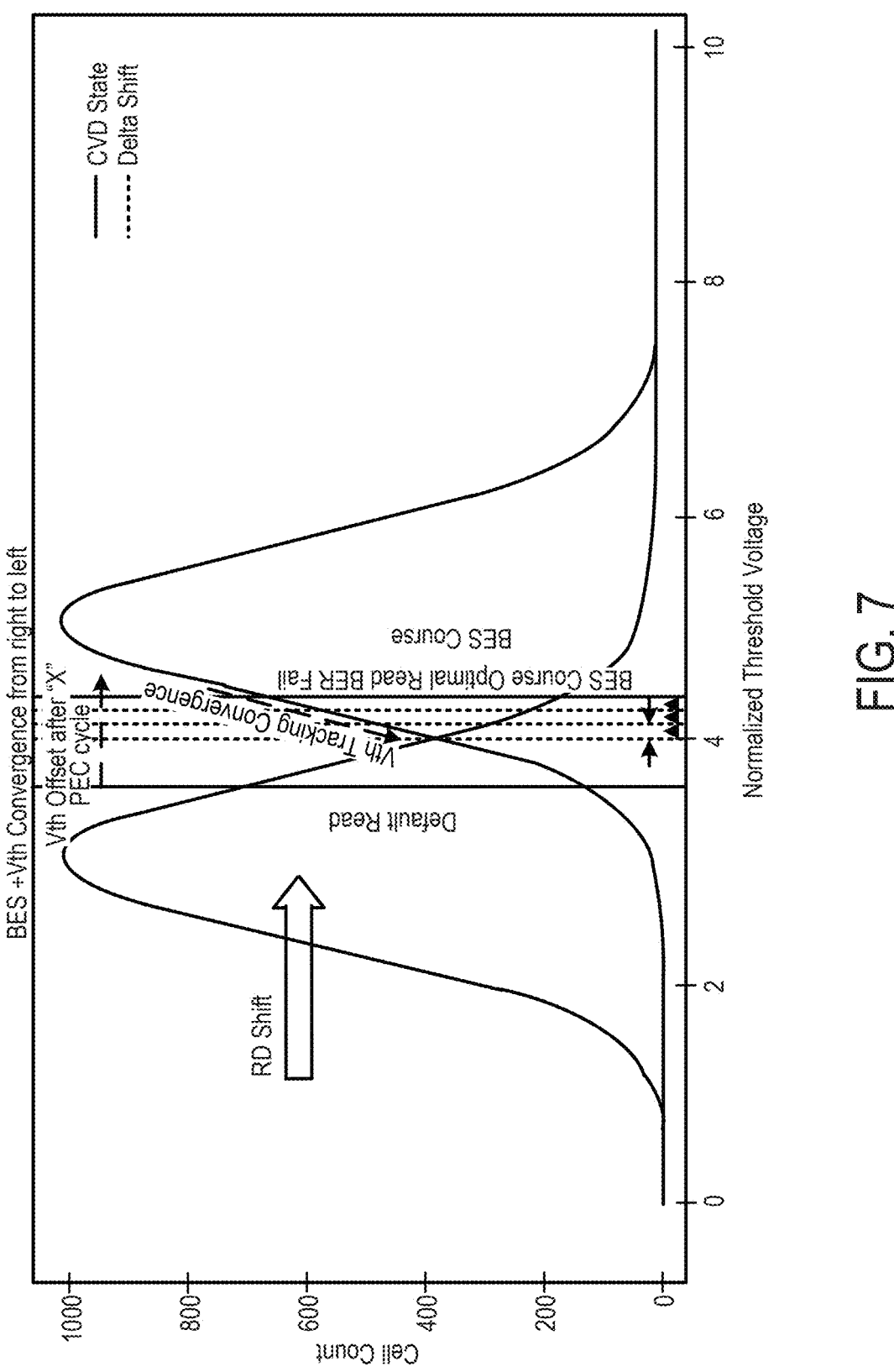
FIG. 7 is a graph of BES with on-chip Vt tracking convergence from right to left after a certain program-erase count (PEC) cycle due to DR.

FIG. 6 is a graph of BES with on-chip Vt tracking convergence from left to right after a certain program-erase count (PEC) cycle due to data retention (DR). This graph explains the general case of CVD state after "X" PEC cycles. Here, the CVD state on the right side is shifted left due to a possible case of data retention (DR). Hence, the default read fails for this scenario as the failed-bit count (FBC) is approximately 800, which is greater than the correction capabilities (any page decode on default read will fail). So, in this example, the controller 102 can apply a Vth offset shift associated with the "X" PEC cycle. FIG. 6 assumes that BES course fails for the BER check and returns the direction of the delta to be applied. FIG. 7 is a graph of BES with on-chip Vt tracking convergence from right to left after a certain program-erase count (PEC) cycle due to DR. This graph explains a similar case for RD.

Figure 8:
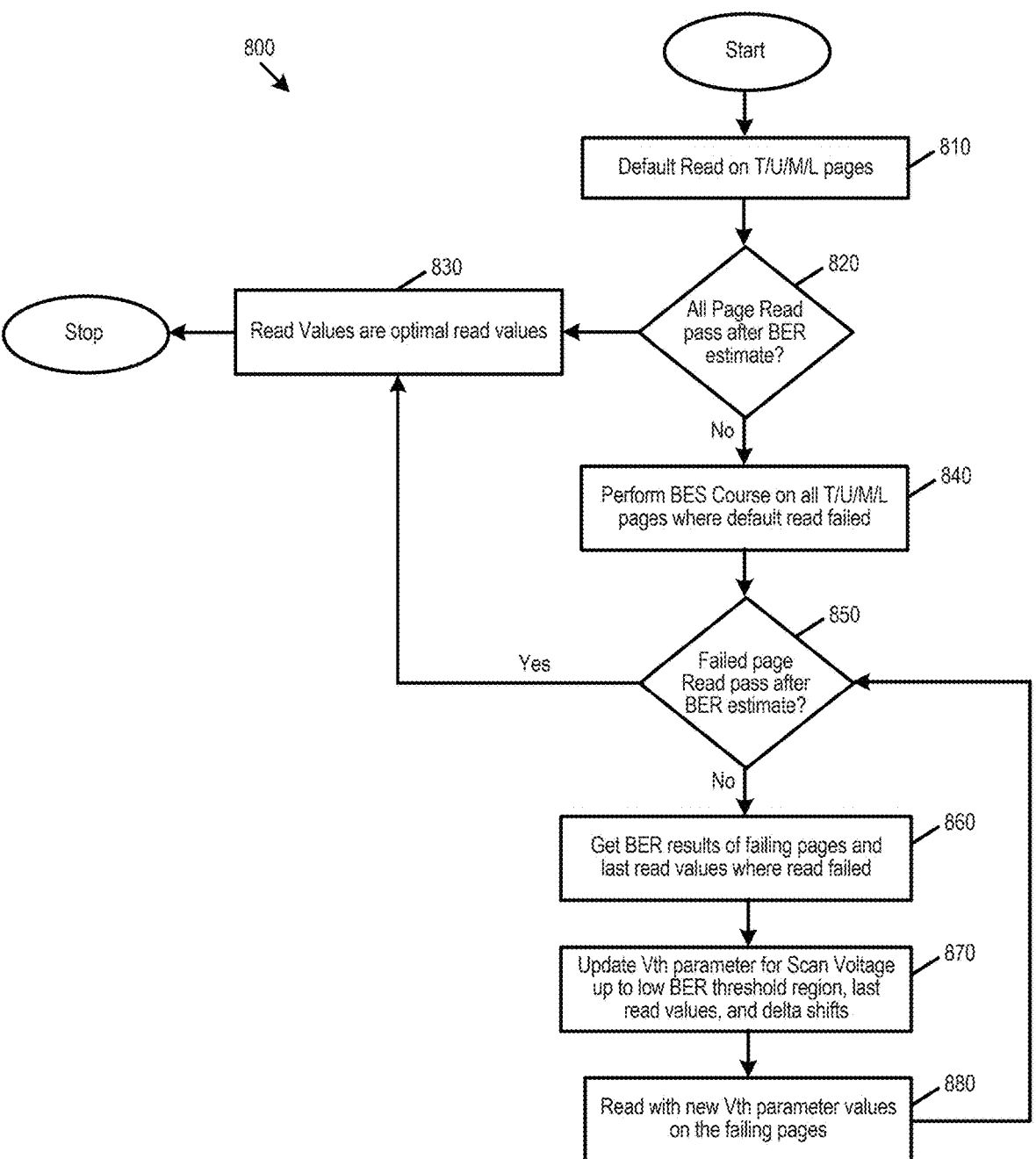
FIG. 8 is a flow chart that illustrates usage of a bit error rate (BER) estimation scan (BES) of an embodiment during a time tag (TT) update.

FIG. 8 is a flow chart 800 that illustrates usage of a bit error rate (BER) estimation scan (BES) of an embodiment during a time tag (TT) update. As shown in FIG. 8, at the start of the method, the controller 102 performs a default read (act 810) and determines if all the page reads pass after a BER estimate (act 820). If all the page reads pass, the read values are optimal read values (act 830), and the method ends. However, if all the page reads do not pass, the controller 102 performs BES course on all pages where the default read failed (act 840) and determines if the failed page read passes after a BER estimate (act 850). If the failed page read passes after the BER estimate, the method loops back to 830. However, if the failed page read does not pass after the BER estimate, the controller 102 gets the BER results of the failing pages and the last read values where the read failed (act 860). The controller 102 then updates the Vth parameter (act 870) and uses that parameter to read the failing pages. The method loops then back to 850.

So, this flow chart 800 explains the flow of the feedback mechanism. Generally, speaking, the controller 102 performs a default read on all pages. Based on which page the reads failed, the controller 102 perform BES course on each logical page. BES course can be performed by reading the data from each logical page at different voltage levels and comparing the results to the expected data. BER (equivalent syndrome weight (SW)) can then be calculated. Based on which page read failed, the controller 102 can use the BER results to update the Vth tracking parameters. The read levels for each page can be adjusted according to the updated Vth tracking parameters. The read levels for the most-unreliable pages can be adjusted to get low BER on such pages. This will reduce the BER for those pages and improve their reliability. The process is repeated until the Vth tracking parameters converge to local minima in the direction of last updated read thresholds.

There are several advantages associated with these embodiments. For example, these embodiments can be used to improve reliability. By ensuring that all logical pages are read with the correct voltage level, these embodiments can reduce the number of errors that occur. This can improve the reliability of the read operation. In the case where data retention impacts a particular page, marking UECC after BES7 failure can be further considered with new Vth parameters. As another advantage, these embodiments can be used to reduce overhead. By only applying Vth tracking to the logical pages that have failed BES7 course, these embodiments can reduce the overhead of the read operation. This can improve the performance of the read operation. As yet another advantage, these embodiments can provide increased flexibility. By having different read thresholds, these embodiments can be more flexible in how data is read from the memory. This can be helpful in situations where some logical pages are more important than others. Further, BiCS10 devices propose to implement on-chip Vth tracking, which is faster than traditional Vth tracking. These embodiments can be used to simplify the design flow and reduce the number of read senses. Additionally, on-chip Vth tracking can be faster than other ways of Vth tracking. Having this solution along with existing BES can prove a good combination to increase read performance.

In summary, these embodiments provide a hybrid variation of BES and on-chip Vth tracking, which allows for adaptive read thresholds based on the changing characteristics of memory cells. BER results from BES failing pages can be used to update the on-chip Vth tracking parameters for scan voltage, number of scans, and/or voltage size between scans. The BER results can be used to identify the most unreliable pages, and the Vth tracking parameters can be updated to reduce the BER for those pages. On-chip Vth tracking is faster than BES since its on-chip and no separate computation is required off the chip (like BES). So, on-chip Vth tracking results can provide a good margin to compare with BES (trade off here is accuracy vs speed). Prior system may use BES or Vth tracking but do not exploit the advantage of using both. The handling in such prior systems may be BES (Course, Extended, Fine) Fail→SB decode, whereas, in one example embodiment, the handling is BES (Course) Fail→Vth Fail→SB decode. That is, BES is used first, followed by Vth later. So, this example embodiment, it is not required to track Vth in order to determine the BES window. As such, from the course window, the controller already knows the read voltage for which the BES course failed, taking that as reference Vth starts and stops at the next read sense. Between these start-and-stop points is the valley point. In case of DR, the valley point shifts left; in case of RD, it shifts to right. Also, with these embodiments, instead of BES valley search, Vth valley search can be used to find an optimal read voltage, which can be faster than BES when given a smaller start stop window criteria. The window where BES failed can be scanned.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
(a) obtain a bit error rate (BER) estimation scan (BES) result from a page in the memory;
(b) update threshold voltage (Vth) tracking parameters for scan voltage, number of scans, and voltage size between scans with the BES result from the page in the memory;
(c) repeating (a) and (b) until the updated Vth tracking parameters converge to a local minima; and
(d) use the updated Vth tracking parameters to read the page in the memory, wherein using the updated Vth tracking parameters to read the page in the memory reduces the BER of the page.

2. The data storage device of claim 1, wherein the one or more processors comprise an integrated circuit and the Vth tracking parameters are updated on-chip in the integrated circuit.

3. The data storage device of claim 1, wherein the one or more processors, individually or in combination, are further configured to perform a soft-bit decode operation.

4. The data storage device of claim 1, wherein the BES is performed during a time tag update.

5. The data storage device of claim 1, wherein the memory comprises a three-dimensional memory.

6. In a data storage device comprising a memory, a method comprising:
(a) obtaining a bit error rate (BER) estimation scan (BES) result from each of a plurality of pages of the memory after a default read of the plurality of pages of the memory;
(b) updating threshold voltage (Vth) tracking parameters for scan voltage, number of scans, and voltage size between scans with the BES results from the plurality of pages in the memory;
(c) repeating (a) and (b) until the updated Vth tracking parameters converge to a local minima;
(d) using the updated Vth tracking parameters to read one of the plurality of pages in the memory, wherein using the updated Vth tracking parameters to read the one of the plurality of pages in the memory reduces the BER of the one of the plurality of pages in the memory.

7. The method of claim 6, wherein the Vth tracking parameters are updated on-chip in an integrated circuit in the data storage device.

8. The method of claim 6, further comprising performing a soft-bit decode operation.

9. The method of claim 6, further comprising performing the BES by:
reading data from each of the plurality of page at different voltage levels; and
comparing the read data to expected data.

10. The method of claim 6, wherein the BES is performed during a time tag update.

11. The method of claim 6, wherein the memory comprises a three-dimensional memory.

12. A data storage device comprising:

a memory; and means for:

(a) obtaining a bit error rate (BER) estimation scan (BES) result from a page in the memory;

(b) updating threshold voltage (Vth) tracking parameters for scan voltage, number of scans, and voltage size between scans with the BES result from the page in the memory;

(c) repeating (a) and (b) until the updated Vth tracking parameters converge to a local minima; and (d) using the updated Vth tracking parameters to read the page in the memory, wherein using the updated Vth tracking parameters to read the page in the memory reduces the BER of the page.

\*   \*   \*   \*   \*